US007231277B2

(12) United States Patent
Kawasaki et al.

(10) Patent No.: US 7,231,277 B2
(45) Date of Patent: Jun. 12, 2007

(54) SURFACE SHAPE DETERMINING DEVICE FOR A MACHINING APPARATUS AND SURFACE SHAPE DETERMINING METHOD

(75) Inventors: Yukio Kawasaki, Toyama (JP); Teruhiro Nishizaki, Toyama (JP); Shiro Murai, Toyama (JP); Hisao Sasaki, Toyama (JP)

(73) Assignee: Nippei Toyama Corporation, Tokyo (JP)

( * ) Notice: Subject to any disclaimer, the term of this patent is extended or adjusted under 35 U.S.C. 154(b) by 0 days.

(21) Appl. No.: 11/148,374

(22) Filed: Jun. 9, 2005

(65) Prior Publication Data

US 2005/0288816 A1 Dec. 29, 2005

(30) Foreign Application Priority Data

Jun. 25, 2004 (JP) .............................. 2004-188537

(51) Int. Cl.
*G06F 19/00* (2006.01)
*G05D 16/00* (2006.01)
*G01B 13/16* (2006.01)
*G01B 13/08* (2006.01)
*G01M 3/02* (2006.01)

(52) U.S. Cl. ...................... 700/163; 700/195; 700/301; 700/161; 702/167; 73/37; 73/37.5; 73/37.8; 73/37.9

(58) Field of Classification Search .................... 73/37, 73/37.5, 37.8, 37.9; 700/195, 301, 161, 163; 702/95, 167

See application file for complete search history.

(56) References Cited

U.S. PATENT DOCUMENTS 3,593,566 A * 7/1971 Loopuyt ..................... 73/37.7

| | | | |
|---|---|---|---|
| 3,976,928 A * | 8/1976 | Wenzel ........................ 318/578 |
| 4,277,880 A * | 7/1981 | Utsumi ........................... 483/4 |
| 4,377,911 A * | 3/1983 | Iida et al. ....................... 33/561 |
| 4,607,960 A * | 8/1986 | Wulff .............................. 374/7 |
| 4,688,179 A * | 8/1987 | Yamazaki .................... 700/161 |
| 4,977,777 A * | 12/1990 | Bieg ........................... 73/37.5 |
| 5,121,041 A * | 6/1992 | Matsuura et al. ........... 318/578 |
| 5,140,239 A * | 8/1992 | Matsuura ..................... 318/577 |
| 5,180,957 A * | 1/1993 | Matsuura et al. ........... 318/578 |
| 5,241,484 A * | 8/1993 | Matsuura et al. ........... 700/161 |
| 5,241,485 A * | 8/1993 | Matsuura ..................... 700/161 |
| 5,283,509 A * | 2/1994 | Matsuura et al. ........... 318/577 |
| 5,616,853 A * | 4/1997 | Oshumi ....................... 73/37.5 |
| 5,653,037 A * | 8/1997 | Hasegawa et al. ......... 33/543.1 |
| 5,789,661 A * | 8/1998 | Fauque et al. ............... 73/37.5 |
| 6,062,948 A * | 5/2000 | Schiff et al. .................... 451/9 |
| 6,220,080 B1 * | 4/2001 | Fauque ........................ 324/662 |
| 6,675,632 B2 * | 1/2004 | Matsutori ................... 73/37.9 |
| 6,708,566 B1 * | 3/2004 | Thompson et al. ........... 73/714 |
| 2002/0069547 A1 * | 6/2002 | Hyatt et al. .................... 33/542 |
| 2005/0005715 A1 * | 1/2005 | Sawafuji et al. ........... 73/865.8 |

FOREIGN PATENT DOCUMENTS

JP 10-339623 A 12/1998
JP 2002-357410 A 12/2002

\* cited by examiner

*Primary Examiner*—Ronald D. Hartman, Jr.
(74) *Attorney, Agent, or Firm*—Sughrue Mion, PLLC

(57) ABSTRACT

In a state of separating a front end face of an air injecting nozzle 23 from a worked work W by a predetermined interval h, the air injecting nozzle 23 is moved at a constant speed in an X axis direction, injects air from an injecting hole 27a of a nozzle main body 27 and is moved to pass centers O1, O2 of worked holes Wb, Wc of the work W. A variation in a pressure is measured by a pressure measuring unit 30. X axis coordinates of the centers O1, O2 of the holes Wb, Wc, a hole diameter E and a center interval distance D1 are calculated based on coordinates of center points T1, T2 of inclined portions Ld, Lu of a curve Lx of the pressure relative to the measured X axis coordinate.

8 Claims, 8 Drawing Sheets

X·Y DIRECTION

X·Y+Z DIRECTION

SURFACE SHAPE DETERMINING DEVICE FOR A MACHINING APPARATUS AND SURFACE SHAPE DETERMINING METHOD

The present invention claims foreign priority to Japanese patent application no. P.2004-188537, filed on Jun. 25, 2005, the contents of which is incorporated herein by reference.

BACKGROUND OF THE INVENTION

1. Field of the Invention

The present invention relates to a surface shape determining device.

2. Description of the Related Art

Generally, in a machine tool, a work is supported by an upper face of a bed via a work supporting table and the work is worked by a tool mounted to a main spindle device numerically controlled to move respectively in three axes directions of X, Y, Z axes similarly on the upper face of the bed. For measuring a position in a Z axis direction of the main spindle device, there are various methods of using, for example, measurement of length by laser, a proximity sensor or a touch sensor or the like. In measuring a displacement by using the sensors, reliability against resistance to environment, adverse environment as in in-line operation, coolant mist, chip or a change in temperature is poor, and there poses a problem of, for example, reading an error, a temperature drift or biting a chip or the like.

In order to resolve the above-described problem, a position detecting apparatus disclosed in Japanese Patent Unexamined Publication JP-A-2002-357410 has been proposed. According to the position detecting apparatus, a fluid delivered from a fluid supply source to a nozzle via a fixed throat is injected from an injecting hole at a front end of the nozzle to an inspection portion of a work or the like and a position of the inspection portion is detected by providing a nozzle back pressure.

On the other hand, an apparatus of measuring a hole diameter and a hole position of a work hole of a work worked by a tool disclosed in Japanese Patent Unexamined Publication JP-A-10-339623 has been proposed. According to the measuring apparatus, a measuring piece provided at a measuring instrument is inserted into a measured hole of a work set to a work positioning jig, and by injecting air from a plurality of injecting ports provided at a vicinity of a front end portion of the measuring piece in a direction orthogonal to a longitudinal direction of the measuring piece, respective back pressure of air are detected. Further, the hole diameter of the measured hole is calculated and a center position of the measured hole is calculated by calculating distances from the respective air injecting ports to an inner peripheral face of the work hole.

However, according to the position detecting apparatus of the JP-A-2002-357410, there poses a problem that although the position of the measured portion of the work or the like can be detected, a surface shape of a measured object cannot be measured.

Further, according to the apparatus of measuring the hole diameter and the hole position of the JP-A-10-339623, there is constructed a constitution of inserting the measuring piece into the measured hole. Therefore, there poses a problem that measuring operation is troublesome, measuring time is prolonged. Further, it is difficult to follow a change in the hole diameter and furthermore, it is difficult to apply to the work hole having a small hole diameter.

SUMMARY OF THE INVENTION

One of objects of the present invention is to resolve the problems and provide an surface shape determining device capable of measuring and informing a surface shape of a measured object as well as detecting a position of the measured object.

Further, another objects of the present invention is to provide an surface shape determining device capable of easily measuring a hole diameter of a work hole of a work and a distance between centers of holes in addition to the above-described first object.

Furthermore, one of the other objects of the present invention is to provide an surface shape determining device capable of correcting of an amount of moving a main spindle device in three axes directions in a working data for working a work.

In order to achieve the above-mentioned objects, the invention described in aspect 1, there is provided a surface shape determining device for a machining apparatus machining a work by a tool mounted to a main spindle device which is numerically controlled to move in X, Y and Z axes, the surface shape determining device determining surface shape of a measured object and comprising:

a fluid injecting unit supplying fluid from a fluid supply source to a nozzle mounted to the main spindle device and injecting the fluid from a front end of the nozzle to the measured object;

a pressure measuring unit measuring pressure of the fluid of the fluid injecting unit;

a nozzle movement control unit moving the nozzle together with the main spindle device;

a surface shape calculating unit calculating the surface shape of the measured object in accordance with change in pressure of the fluid measured by the pressure measuring unit; and an informing unit informing data of the surface shape calculated by the surface shape calculating unit.

According to the invention described in aspect 2 as set forth in the aspect 1, it is preferable that the surface shape calculating unit calculates a position of a stepped portion or a hole formed at the measured object.

According to the invention described in aspect 3 as set forth in the aspect 1, it is preferable that the surface shape calculating unit calculates a flatness of the measured object.

According to the invention described in aspect 4 as set forth in the aspect 1, it is preferable that the surface shape determining device further comprising:

a center coordinates calculating unit calculating center coordinates of the hole formed on the measured object;

a hole diameter calculating unit calculating hole diameter; and a distance calculating unit calculating distance between centers of the holes.

According to the invention described in aspect 5 as set forth in the aspect 1, it is preferable that the nozzle movement control unit moves the nozzle at constant speed together with the main spindle device in a state of maintaining a distance between the front end of the nozzle of the fluid injecting unit and an inspection surface of the measured object.

According to the invention described in aspect 6 as set forth in the aspect 1, it is preferable that the measured object is a jig arranged at a reference position which is another member of the work, the surface shape determining device further comprising:

a Z axis initial coordinate value setting unit for setting a Z axis initial coordinate value at a Z axis initial coordinate position which is a position that the main spindle device opposes to a plane portion of the jig and has predetermined distance in a Z axis direction between the front end of the nozzle and the plane portion of the jig constant;

an X axis initial coordinate value setting unit setting an X axis initial coordinate value at an X axis initial coordinate position which is a position that the main spindle device opposes to a first stepped portion formed at the jig and has predetermine distance in a Z axis direction between the front end of the nozzle and the first stepped portion constant;

a Y axis initial coordinate value setting unit setting a Y axis initial coordinate value at a Y axis initial coordinate position which is a position that the main spindle device opposes to a second stepped portion formed at the jig and has predetermined distance in a Z axis direction between the front end of the nozzle and the second stepped portion constant;

pre-working initial data storing unit storing pre-working initial data including respective relationships between coordinates of three axes and the pressure, which are measured by the pressure measuring unit such that moving the nozzle so as to pass through the respective initial coordinate positions of the three axes and injecting the fluid to the jig before working the work;

after-working data storing unit storing after-working data including respective relationships between the coordinates of three axes and the pressure, which are measured by the pressure measuring unit such that moving the nozzle to the respective initial coordinate positions of the three axes in series and injecting the fluid to the jig after working the work;

measured coordinate value generating unit generating respective measured coordinate values of three axes in accordance with the pre-working initial data and the after-working data; and a moving amount correcting unit correcting moving amount of the main spindle device in the three axes of work data in accordance with the respective initial coordinate values and the respective measured coordinate values.

According to the invention described in aspect 7 as set forth in the aspect 6, it is preferable that inclined surfaces are provided between the plane portion of the jig and a first stepped portion and a second stepped portion, and the inclined surface is getting away from the front end of the nozzle as the inclined surface is approaching to the first or second stepped portion.

According to the invention described in aspect 8, there is provided a surface shape determining method for a machining apparatus machining a work by a tool mounted to a main spindle device which is numerically controlled to move in X, Y and Z axes and includes a nozzle for injecting fluid and a pressure measuring unit for measuring pressure of the fluid, the surface shape determining method determining surface shape of a measured object and comprising the steps of:

injecting the fluid from the nozzle to the measured object and measuring the pressure of the fluid by the pressure measuring unit while moving the nozzle in the X and Y axes directions at constant speed with maintaining distance between the nozzle and a working surface of work at predetermined value; and calculating the surface shape of the measured object in accordance with the measured pressure of the fluid.

According to the invention described in aspect 9 as set forth in the aspect 8, it is preferable that the calculated surface shape of the measured object includes center coordinates of a hole formed on the measured object, hole diameter of the hole, center interval distance of the holes or flatness of the measured object.

According to the invention described in aspect 10 as set forth in the aspect 8, it is preferable that the method further comprising the steps of:

setting initial coordinate values of the three axes of the nozzle before working the work;

moving the nozzle in the three axes so as to pass through respective initial coordinate positions of the three axes and injecting the fluid from the front end of the nozzle in order to measure the respective coordinates of the three axes and pressure before working the work;

storing pre-working initial data of the nozzle including respective coordinates of the three axes and pressure before working the work;

removing the nozzle from the main spindle device and mounting a working tool to the main spindle device;

moving the main spindle device in the three axes directions to thereby work the work by the working tool;

removing the working tool after finishing working and mounting the nozzle to the main spindle device;

injecting the fluid from the front end of the nozzle to the measured object so as to measure the respective coordinates of the three axes and pressure by moving the nozzle to respective initial coordinate positions in series so as to measure pressure at respective initial coordinate position of the three axes of the nozzle after working the work;

storing after-working data including respective relationships between the coordinates of three axes and the pressure after working the work;

generating measured coordinate values of the three axes in accordance with the pre-working initial data and the after-working data; and correcting moving amount in accordance with the measured coordinate values and the initial coordinate values of the three axes.

According to the invention described in the above aspects, the position of the measured object can be detected and the surface shape of the measured object can be measured and informed.

According to the invention described in aspect 2, in addition to an effect of the invention described in aspect 1, the position of the stepped portion or the hole formed at the measured object can be calculated by the surface shape calculating unit.

According to the invention described in aspect 3, in addition to an effect of the invention described in aspect 1, the flatness of the measured object can be calculated by the surface shape calculating unit.

According to the invention described in aspect 4, in addition to the effect of the invention described in aspect 1, the center coordinates of the plurality of holes formed at the work as the measured object, the hole diameter and the center interval distance of the hole can be calculated by the surface shape calculating unit, the means for calculating the center coordinates of the hole, the means for calculating the hole diameter and the means for calculating the center interval distance of the plurality of holes.

According to the invention described in aspect 5, in addition to an effect of the invention described in aspect 1, by the nozzle movement control unit, the nozzle can be moved at the constant speed by the main spindle device in the state of maintaining the distance between the front end of the nozzle of the fluid injecting unit and the surface of the measured object constant by the nozzle movement control unit and therefore, accuracy of determining the shape of the measured object can be promoted.

According to the invention described in aspect 6, in addition to the effect of the invention described in aspect 1, the amount of moving the main spindle device in the three axes directions of the working data of the work can be corrected. Therefore, accuracy of the working the work can be promoted.

According to the invention described in aspect 7, in addition to the effect of the invention described in aspect 1, the amount of changing the pressure per the unit distance of the initial coordinates and pressure data in the X axis and the Y axis directions can be set to be large, and accuracy of correcting the amount of moving the main spindle device in the three axes directions can be promoted by promoting accuracy of detecting the pressure.

DETAILED DESCRIPTION OF THE PREFERRED EMBODIMENTS

An explanation will be given of an embodiment of a surface shape determining device embodying the invention in reference to FIG. 1 through FIG. 10 as follows.

Figure 6:
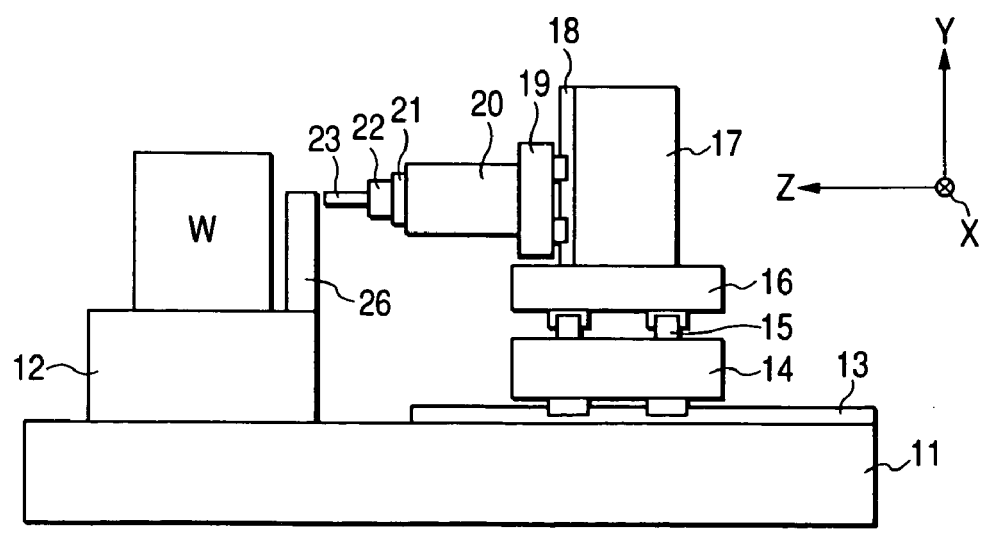
FIG. 6 is a front view showing a total constitution of a machine tool.

First, an outline constitution of a machine tool will be explained. As shown in FIG. 6, an upper face of a bed 11 is mounted with a work supporting table 12 for supporting a work W as a measured object. A Z axis guide rail 13 is laid on an upper face of the bed 11, and a Z axis saddle 14 is supported by the Z axis guide rail 13 reciprocatably in a Z axis direction (left and right direction of FIG. 6) by a Z axis drive mechanism 40A (refer to FIG. 7), mentioned later. An X axis guide rail 15 is laid on an upper face of the Z axis saddle 14, and an X axis saddle 16 is mounted to the X axis guide rail 15 reciprocatably in an X axis direction (direction orthogonal to paper face of FIG. 6) by an X axis drive mechanism 40B (refer to FIG. 7), mentioned later. A column 17 is erected at an upper face of the X axis saddle 16, a Y axis guide rail 18 is laid at a front face of the column 17, and the Y axis guide rail 18 is mounted with a Y axis saddle 19 reciprocatably in a Y axis direction (up and down direction of FIG. 6) by a Y axis drive mechanism 40C (refer to FIG. 7), mentioned later.

The Y axis saddle 19 is mounted with a main spindle device 20, and a main spindle 21 rotatably supported at an inner portion of the main spindle device 20 is mounted with an air injecting nozzle 23 for injecting air as a fluid via a nozzle holder 22. The nozzle holder 22 is taken out from the main spindle 21 by a tool interchanging apparatus, not illustrated, and is interchanged by a tool holder (not illustrated) mounted with a tool.

Figure 1:
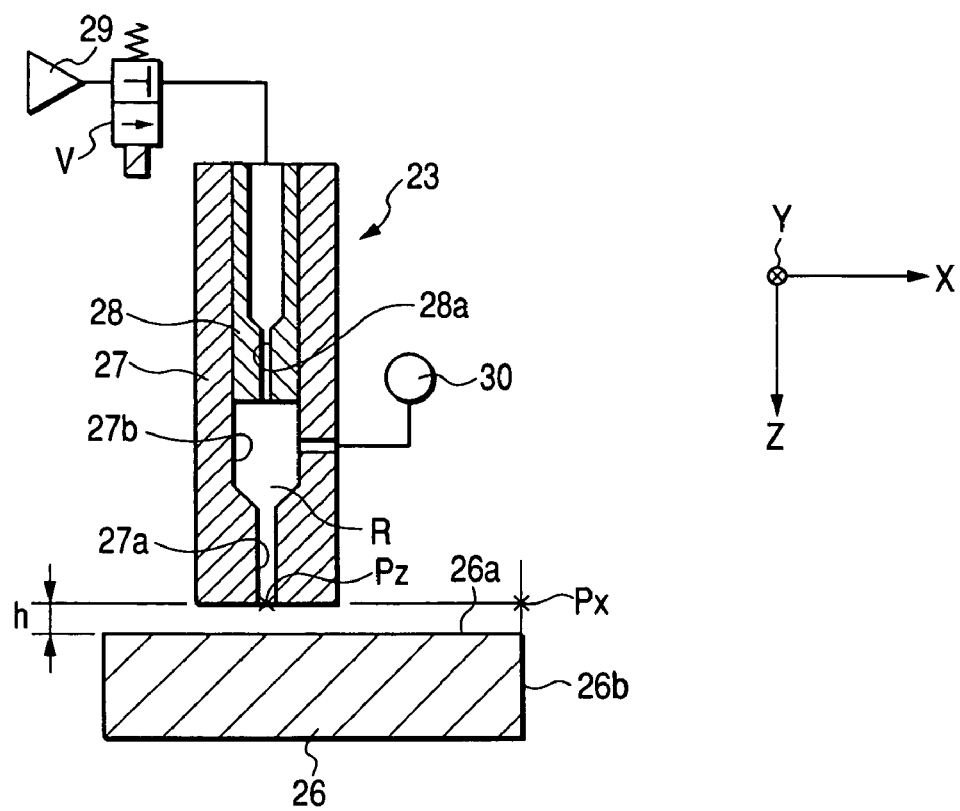
FIG. 1 is a vertical sectional view viewed from a Y axis direction showing a relationship between an air injecting nozzle and a measured object according to the invention.

An upper face of the work supporting table 12 is attached with a jig 26 as a measured object separate from the work W. As shown in FIG. 1, the air injecting nozzle 23 is provided with a nozzle main body 27 including an injecting hole 27a and a pressure chamber 27b, and an orifice 28 including a throat path 28a fixedly fitted to the pressure chamber 27b. A base end portion of the orifice 28 is supplied with pressurized air from an air supply source 29 as a fluid supply source of a compressor or the like. An electromagnetic type opening/closing valve V is provided between the air injecting nozzle 23 and the air supply source 29. A pressure detecting chamber R is formed between the injecting hole 27a and the throat path 28a, and a pressure measuring unit 30 as pressure measuring unit is mounted to the nozzle main body 27 to communicate with the pressure detecting chamber R. By providing the orifice 28, a variation in a pressure in the pressure detecting chamber R is alleviated.

According to the embodiment, a fluid injecting unit is constituted by the main spindle device 20, the main spindle 21, the nozzle holder 22, the air injecting nozzle 23, the nozzle main body 27, the orifice 28 and the air supply source 29 and the like.

Figure 2:
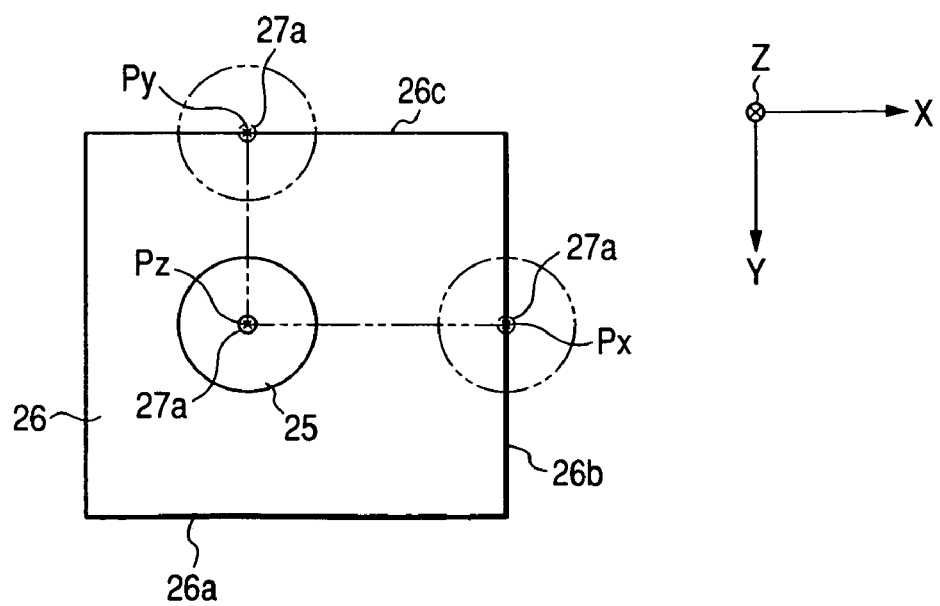
FIG. 2 is a front view viewed from a Z axis direction showing a relationship between the air injecting nozzle and the measured object.
Figure 3:
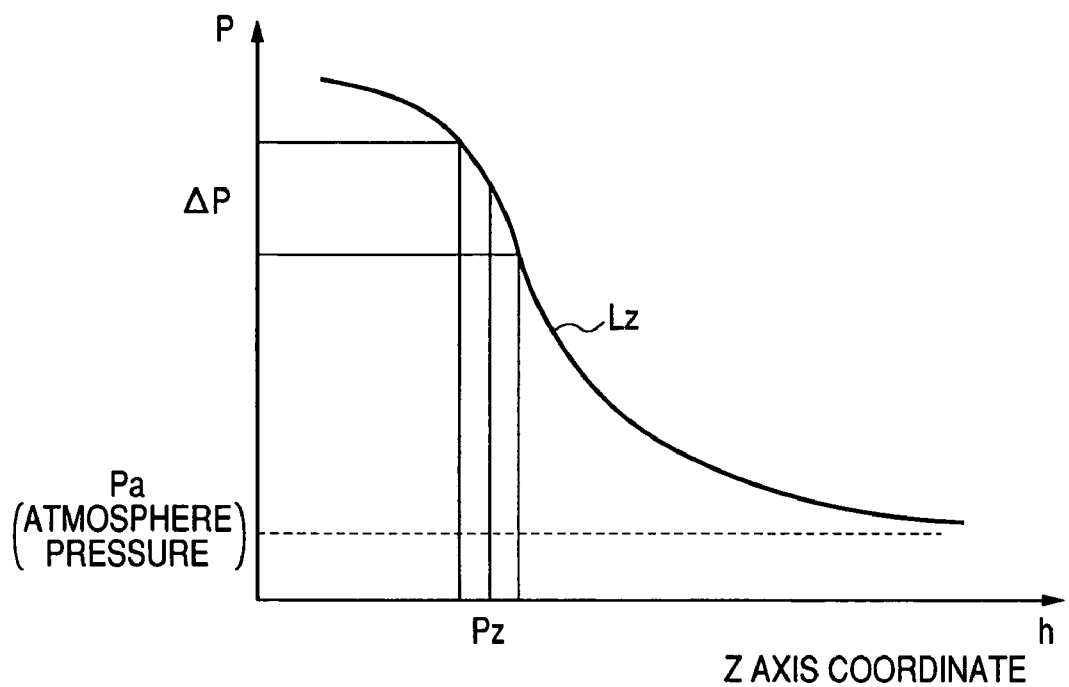
FIG. 3 is a graph showing a relationship between a Z axis coordinate and a pressure injected by the air injecting nozzle.
Figure 4:
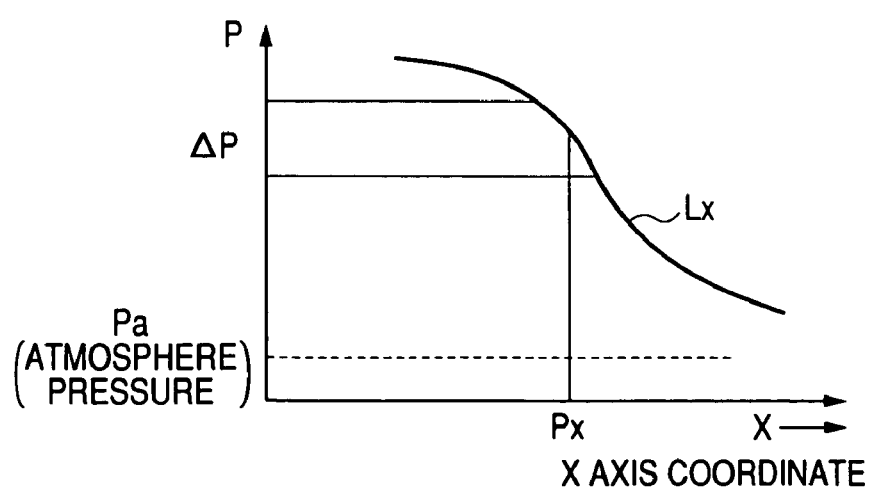
FIG. 4 is a graph showing a relationship between an X axis coordinate and a pressure injected by the air injecting nozzle.
Figure 5:
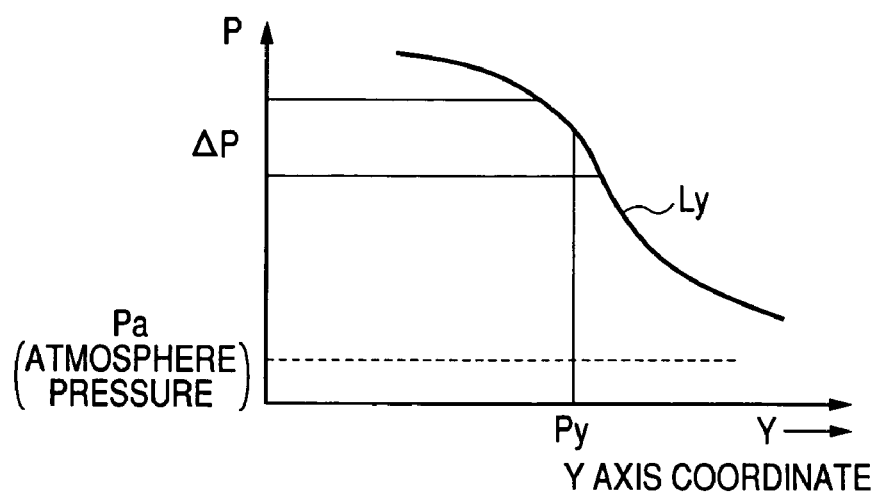
FIG. 5 is a graph showing a relationship between a Y axis coordinate and a pressure injected by the air injecting nozzle.

As shown in FIG. 1 and FIG. 2, the jig 26 is formed with a plane portion 26a as a measured face, and a position of the jig 26 separated from the plane portion 26a by a predetermined distance is made to constitute a Z axis initial coordinate position Pz. Further, a predetermined position above a first end face 26b as a first stepped portion on a right side of the jig 26, that is, a position separated from the Z axis initial coordinate position Pz by a predetermined distance in the X axis direction is made to constitute an X axis initial coordinate position Px. Further, as shown in FIG. 2, a predetermined position above a second end face 26c as a second stepped portion at an upper end of the jig 26, that is, a position separated from the Z axis initial coordinate position Pz by a predetermined distance in the Y axis direction is made to constitute a Y axis initial coordinate position Py.

The plane portion 26a of the jig 26 is applied with a coating of polytetrafluoroethylene or the like so that chip, dust and dirt or the like is not adhered thereto. Further, the nozzle main body 27 is provided with an auxiliary air injecting nozzle (not illustrated) for removing a foreign matter of chip or the like adhered to the plane portion 26a of the jig 26.

Figure 7:
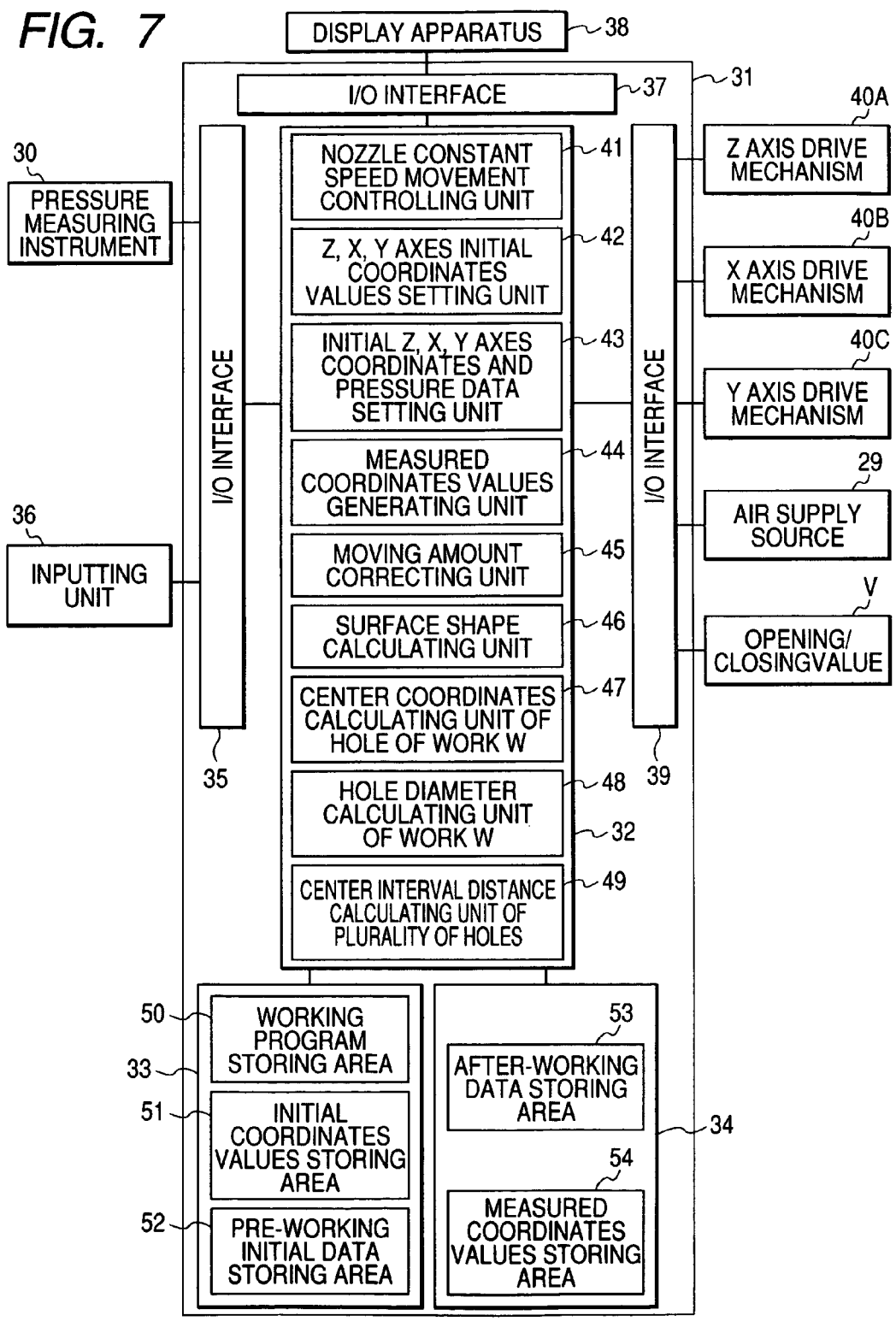
FIG. 7 is a block circuit diagram of a control system.

Next, an explanation will be given of a control system for correcting a working data of a work of a machine tool in reference to FIG. 7.

A control apparatus 31 is provided with a central processing unit (CPU) 32 for processing various operations. The CPU 32 is connected with a rewritable in volatile memory 33 stored with various the working data as the working data for controlling operation of the machine tool, or a measuring program or the like. Further, the CPU 32 is connected with a readable/writable random access memory (RAM) 34 for storing various data. The CPU 32 is connected with inputting means 36 of a key board or a mouse or the like via an input/output interface 35. The CPU 32 is connected with a display apparatus 38 as informing unit similarly via an input/output interface 37. The CPU 32 is connected with the respective shaft drive mechanisms 40A, 40B, 40C of Z, X, Y axes similarly via an input/output interface 39 and a driving circuit, not illustrated and the main spindle device is numerically controlled to move respectively in X, Y, Z axes directions.

The CPU 32 is connected with the pressure measuring unit 30 via the input/output interface 35. The CPU 32 is connected with the air supply source 29 and the opening/closing valve V via the input/output interface 39 and a driving circuit, not illustrated.

The CPU 32 is provided with nozzle constant speed movement controlling unit 41 as nozzle movement control unit for moving the main spindle device 20 and the air injecting nozzle 23 at a constant speed in a state of maintaining an interval h (for example, 0.5 mm) between the plane portion 26a of the jig 26 and the work W as shown in FIG. 1. Further, the CPU 32 is provided with Z, X, Y axes initial coordinates values setting unit 42 to respectively set the Z axis initial coordinate value, the X axis initial coordinate value and the Y axis initial coordinates value. In setting the initial coordinates values of three axes, the respective initial coordinates values are successively set by the initial coordinate values setting unit 42 by operating the inputting means 36 by an operator in a state of successively moving the air injecting nozzle 23 to the respective initial coordinate positions Pz, Px, Py of Z axis, X axis, Y axis as shown in FIG. 1 and FIG. 2, mentioned above.

The CPU 32 is provided with initial Z, X, Y axes coordinates and pressure data setting unit 43 as the pre-working initial data storing unit. The coordinates and pressure data setting unit 43 is provided with a function of injecting air from the injecting hole 27a to the plane portion 26a of the jig 26 while moving the air injecting nozzle 23 to pass the Z axis initial coordinate position Pz as shown in FIG. 1 and forming data of a relationship between the interval h at this occasion. That is, the coordinate in the Z axis direction and a pressure measured by the pressure measuring unit 30 to set as shown in a graph of FIG. 3. Further, the coordinates and pressure data setting unit 43 is provided with a function of injecting air from the injecting hole 27a of the nozzle main body 27 to the first end face 26b while moving the air injecting nozzle 23 in the X axis direction to pass the X axis initial coordinate position Px and forming data of a relationship between the coordinate in the X axis direction at this occasion and a pressure measured by the pressure measuring unit 30 as shown in a graph of FIG. 4. Similarly, the coordinates and pressure data measuring unit 43 is provided with a function of injecting air from the injecting hole 27a of the nozzle main body 27 to the second end face 26c of the jig 26 while moving the air injecting nozzle 23 in the Y axis direction to pass the Y axis initial coordinate position Py and forming data of a relationship between the coordinate in the Y axis direction at this occasion and a pressure measured by the pressure measuring unit 30 as shown in a graph of FIG. 5.

The CPU 32 is provided with after-working data storing unit storing after-working data including respective relationships between the coordinates of three axes and the pressure, which are measured by the pressure measuring unit 30 such that moving the nozzle 23 to the respective initial coordinate positions of the three axes in series and injecting the fluid to the work after working the work. The CPU 32 is also provided with measured coordinate values generating unit 44. The measured coordinate values generating unit 44 is provided with a function of respectively calculating actual measured coordinates values of three axes in accordance with measured pressure respectively measured by moving the air injecting nozzle 23 to the respective initial coordinates positions Pz, Px, Py after working the work and the initial coordinates and pressure data which are stored in the after-working data storing unit.

The CPU 32 is provided with moving amount correcting unit 45. The moving amount correcting unit 45 is provided with a function of correcting an amount of moving the main spindle device 20 in a working data based on previously set initial coordinates values of three axes and the actual measured coordinates values.

The CPU 32 is provided with surface shape calculating unit 46 for calculating a shape of a surface Wa of a working face of the work W as a measured object based on measured pressure data from the pressure measuring unit 30. Similarly, the CPU 32 is provided with center coordinates calculating unit 47 for calculating center coordinates O1$xy$, O2$xy$ of holes Wb, Wc worked at the work W. Similarly, the CPU 32 is provided with hole diameter calculating unit 48 for calculating a hole diameter E. The center coordinates calculating unit 47 and the hole diameter calculating unit 48 calculate center coordinates O1$xy$, O2$xy$ and the hole diameter E by the following procedure when the two working holes Wb, Wc are formed at the surface Wa of the work W at a predetermined interval therebetween in the X axis direction.

Figure 8:
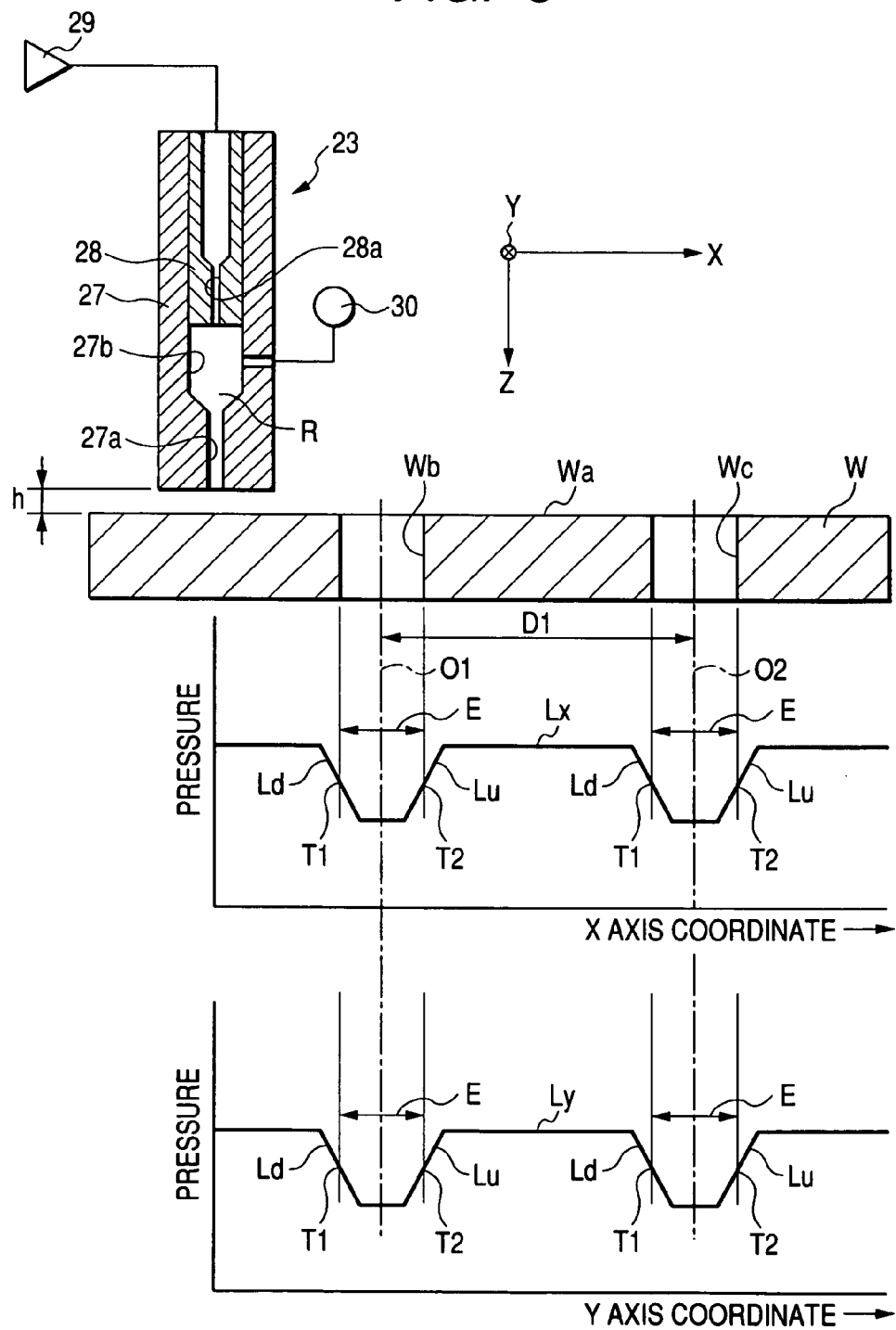
FIG. 8 is a sectional view showing a relationship between a worked work and the air injecting nozzle.
Figure 9:
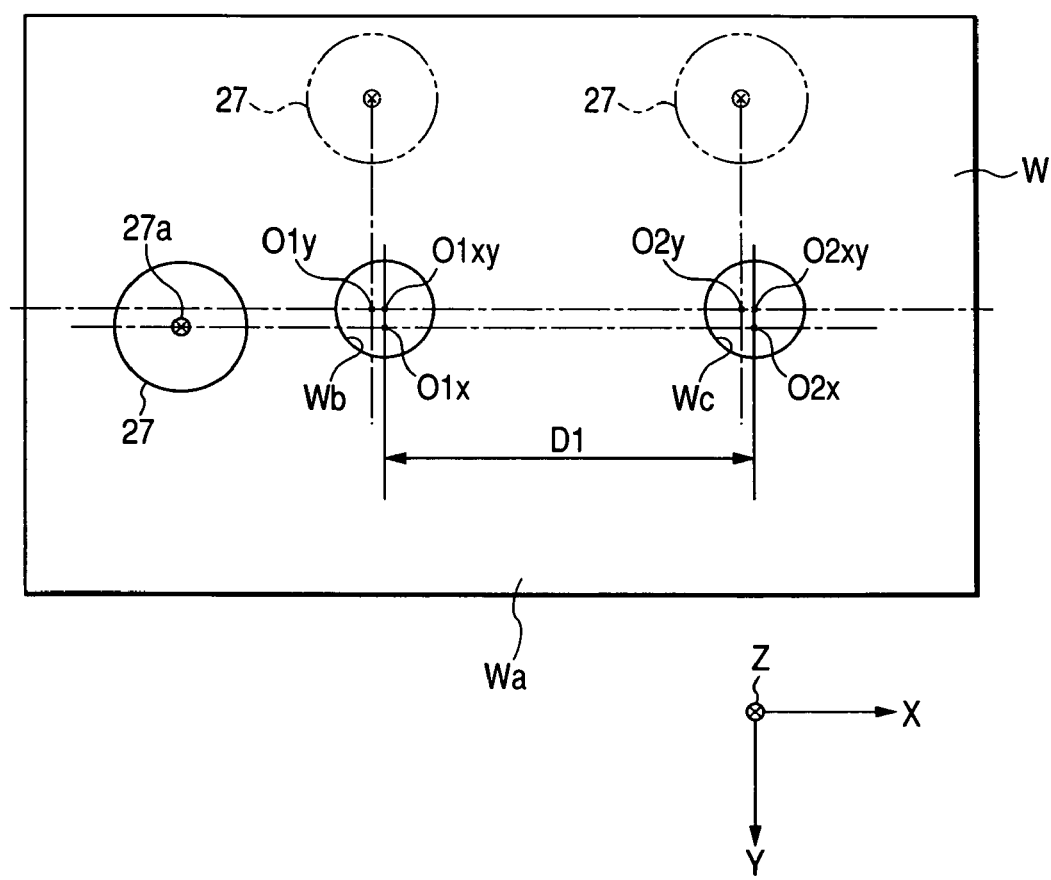
FIG. 9 is a plane view showing a relationship between the worked work and the air injecting nozzle.

First, by the nozzle constant movement controlling unit 41, the air injecting nozzle 23 is moved at a constant speed in the X axis direction in a state of being separated from the surface Wa of the work W, and a pressure at that occasion is measured by the pressure measuring unit 30. The measured pressure becomes a curve Lx of a graph indicating an X axis coordinate at the abscissa and a pressure at the ordinate as shown in FIG. 8, and the data is stored to RAM 34 as surface shape data. Therefore, by calculating center points of pressure change points of an inclined portion Ld of the curve Lx at which the pressure drops and an inclined portion Lu at which the pressure rises by the center coordinates calculating unit 47, coordinates O1$x$, O2$x$ in the X axis direction of centers O1, O2 of the work holes Wb, Wc are set. Next, by moving the air injecting nozzle 23 twice in the Y axis direction to respectively pass the holes Wb, Wc as shown in FIG. 9, similar to measurement and calculation of the coordinate with regard to the X coordinate, coordinates O1$y$, O2$y$ with regard to the Y axis direction of the centers O1$y$, O2 of the work holes Wb, Wc are calculated. The center coordinates O1$xy$, O2$xy$ of the work holes Wb, Wc are calculated by the center coordinates calculating unit 47 from the X axis coordinates O1$x$, O2$x$ and the Y axis coordinates O1$y$, O2$y$.

Next, by moving the air injecting nozzle 23 in the X axis (or Y axis) direction to respectively pass the center coordinates O1$xy$, O2$xy$ of the work holes Wb, Wc, pressure data is stored and based on the pressure data, the dimension of the hole diameter E of the work holes Wb, Wc are respectively calculated by the hole diameter calculating unit 48. The dimension is calculated by calculating coordinates of positions of respective center points T1, T2 of the inclined portion Ld and the inclined portion Lu of the curve Lx (or curve Ly) of the pressure data.

The CPU 32 is provided with center interval distance calculating unit 49 for calculating a distance D1 between the centers O1, O2 of the holes Wb, Wc worked at the work W. The center interval distance calculating unit 49 calculates the center interval distance D1 based on the center coordinates O1xy, O2xy of the work holes Wb, Wc calculated previously.

The rewritable in volatile memory 33 is provided with a working program storing area 50 for storing the working data for controlling working operation of the work and is provided with initial coordinates values storing area 51 for storing the initial respective coordinates values of the Z axis, X axis, Y axis previously set. Further, the rewritable in volatile memory 33 is provided with a pre-working initial data storing area 52 as initial coordinates and pressure data storing means for storing initial coordinates and pressure data. The RAM 34 is provided with a after-working data storing area 53 for storing measured pressure data of three axes and provided with measured coordinates values storing area 54 as measured coordinates values storing means for storing measured coordinates values generated by the measured coordinate values generating unit 44.

Next, an explanation will be given of various operation of the machine tool constituted as described above.

Various operation of the machine tool will be explained in reference to FIG. 10.

Figure 10:
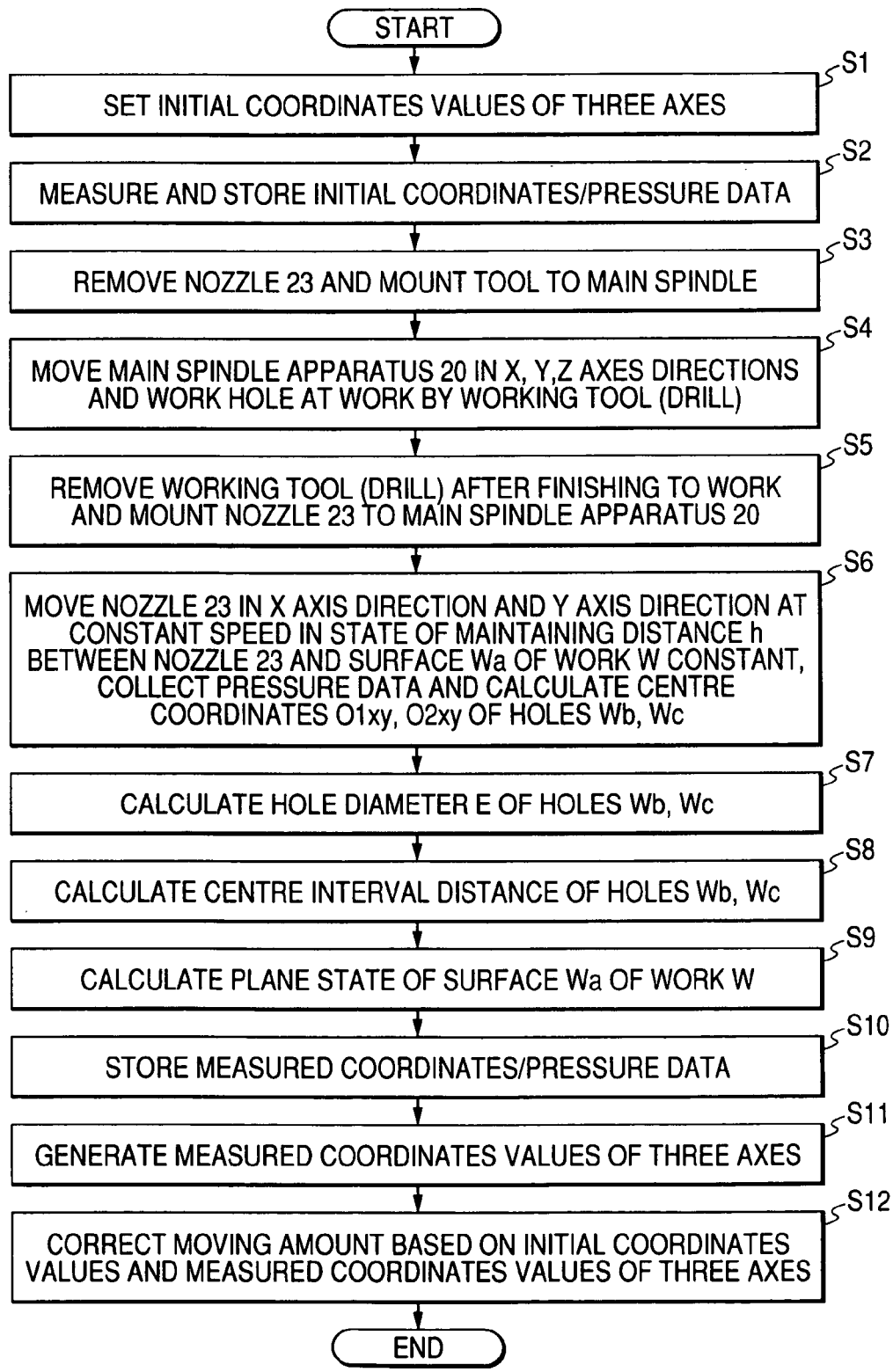
FIG. 10 is a flowchart for explaining various operation of the machine tool.

At step S1 of FIG. 10, the initial coordinates values in three axes directions of Z, X, Y axes of the air injecting nozzle 23 mounted to the main spindle device 20 are successively set as described above to store to the storing area 51. At step S2, the initial coordinates and pressure data showing the relationship between the initial coordinates and pressure data of the air injecting nozzle 23 and the pressure as described above, to store to the pre-working initial data storing area 52. Next, at step S3, the air injecting nozzle 23 is removed from the main spindle 21 of the main spindle device 20 and a tool holder (not illustrated) mounted with, for example, a drill is mounted to the main spindle 21 of the main spindle device 20.

Next, at step S4, the holes are worked at the work W by the drill by moving the main spindle device 20 in three axis directions. As shown in FIG. 8 and FIG. 9, the work W is formed with the holes Wb, Wc at two locations separated from each other by the predetermined distance in the X axis direction. Further, by interchanging the tool from the drill to a cutter, the surface of the work is finished.

At step S5, after finishing working, the working tool (e.g. the drill) is removed from the main spindle 21 along with the tool holder and the air injecting nozzle 23 is mounted to the main spindle 21. At step S6, a front face of the air injecting nozzle 23 is separated from the surface Wa of the worked work W in the Z axis direction by the predetermined interval h, the air injecting nozzle 23 is moved in the X axis direction and the Y axis direction as described above in a state of maintaining the interval h constant to store a pressure data and the center coordinates O1xy, O2xy of the holes Wb, Wc are calculated by the center coordinates calculating unit 47.

Next, at step S7, by the hole diameter calculating unit 48, the dimension of the hole diameter E of the holes Wb, Wc is calculated as described above. At step S8, based on the center coordinates O1xy, O2xy of the working holes Wb, Wc calculated previously, the center interval distance D1 between the holes Wb, Wc is calculated by the center interval distance calculating unit 49. Further, at step S9, a plane state of the surface Wa of the work W is calculated by the surface shape calculating unit 46.

Next, at step S10, the air injecting nozzle 23 is moved to a side of the jig 26, pressure at the initial coordinates positions Pz, Px, Py of three axes are respectively measured as described above, and the measured coordinates and pressure data is stored to the after-working data storing area 53. At step S11, based on the measured pressure data of the respective axes coordinates and the previously stored initial coordinates and pressure data, the measured coordinates values of three axes are calculated by the measured coordinate values generating unit 44. At step S12, based on the initial coordinates values of three axes and the measured coordinates values of three axes, by the moving amount correcting unit 45, the amount of moving the main spindle device 20 of the working data is corrected.

Thereby, working accuracy by the working tool of the work W to be worked successively is promoted.

According to the apparatus of determining the surface shape of the measured object in the machine tool of the embodiment, the following effects can be achieved.

(1) According to the embodiment, the pressure is measured by the pressure measuring unit 30 by injecting air to the surface Wa of the work W while moving the air injecting nozzle 23 in the X axis direction or the Y axis direction in the state of separating the air injecting nozzle 23 from the work W by the predetermined interval hand at the constant speed. Therefore, the flatness of the worked surface Wa of the work W can be measured by a variation in the pressure.

(2) According to the embodiment, the variation in the pressure is measured by moving the air injecting nozzle 23 in the X axis direction and the Y axis direction to pass the plurality of worked holes Wb, Wc of the work W and based on the variation in the pressure, by the hole diameter calculating unit 48 and the center interval distance calculating unit 49, the hole diameter E dimension and the center interval distance D dimension are calculated as described above. Therefore, it is not necessary to insert measuring piece or the like into the hole and measuring operation can be carried out swiftly and simply. Further, a dimension of a hole having a small diameter and a dimension of a hole having a large diameter can easily be measured.

(3) According to the embodiment, the jig 26 is provided at a reference position at a vicinity of the work supporting table 12, and the initial coordinate values in the three axes directions of the air injecting nozzle 23 relative to the jig 26 are respectively set and stored to the initial coordinates values storing area 51. Further, data indicating the relationship between the initial coordinates and the pressure under the state is measured and stored to the pre-working initial data storing area 52. Further, after working the work W, the air injecting nozzle 23 is successively moved to the initial coordinates positions Pz, Px, Py of respective axes, the actual pressure is measured by injecting air from the air injecting nozzle 23, and based on the measured pressure data and the set initial coordinates and pressure data, measured coordinates values of respective axes are generated by the measured coordinate values generating unit 44. Further, by the moving amount correcting unit 45, the amount of moving the main spindle device of the working data is corrected based on a difference between the initial coordinates values of three axes and the measured coordinates values of three axes. Therefore, the amount of moving the main spindle device 20 of the working data can be corrected properly.

Further, the above-described embodiment may be modified as follows.

Figure 11:
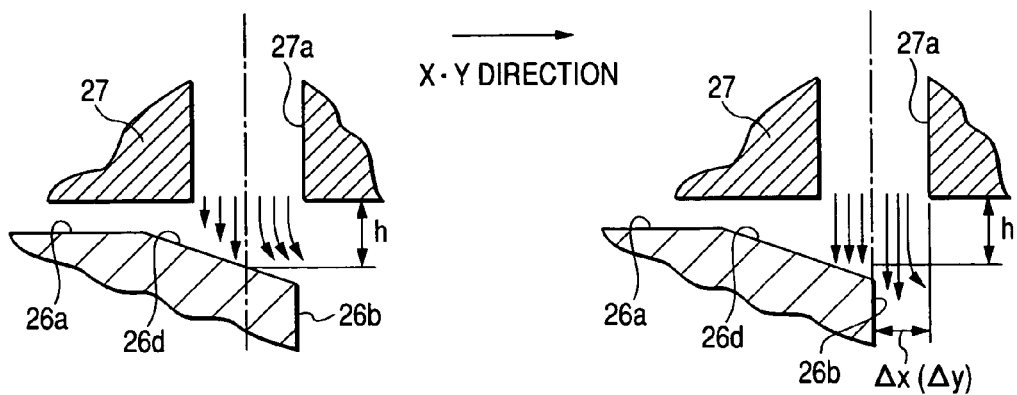
FIG. 11 illustrates sectional views showing other embodiment of the invention.
Figure 12:
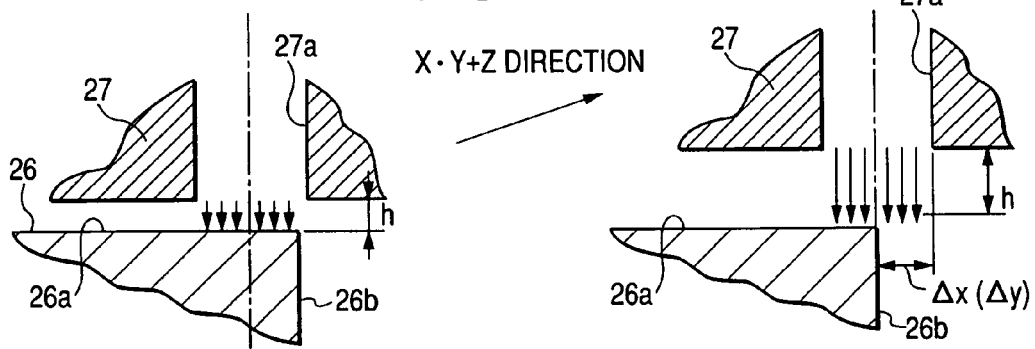
FIG. 12 illustrates sectional views showing other embodiment of the invention.
Figure 13:
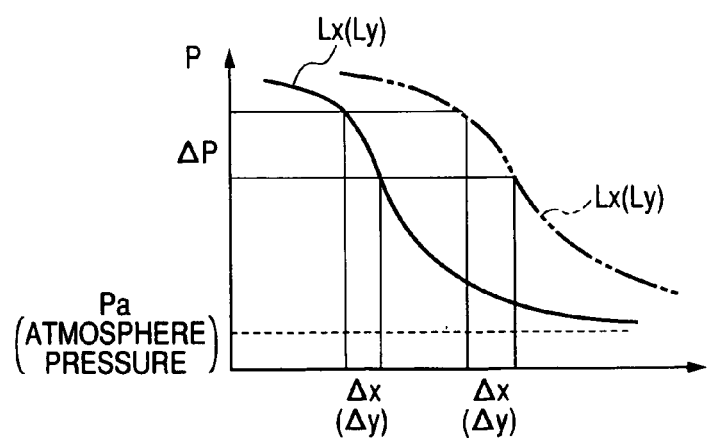
FIG. 13 is a graph showing a relationship between coordinates and a pressure according to the other embodiments.

As shown in FIG. 11, an inclined face 26d may be formed to the first end face 26b of the jig 26, and the interval h between the jig 26 and the nozzle main body 27 may be increased when the nozzle main body 27 is moved in the X axis (Y axis) direction. Further, as shown in FIG. 12, the interval between the jig 26 and the nozzle main body 27 may be increased by numerically controlling to move the air injecting nozzle 23 in a skewed upper direction. In these cases, as shown in FIG. 13, the curve Lx (Ly) indicated by a two-dotted chain line [refer to FIGS. 4, 5] becomes as shown in a curve Lx (Ly) shown in a bold line, a rate of a change amount of ΔP of the pressure P per a unit distance Δx (Δy) in the axial direction is increased, accuracy of detecting pressure is promoted, and accuracy of correcting the amount of moving the main spindle device 20 in three axes directions can be promoted.

The pressure measuring unit 30 provided at the air injecting nozzle 23 may be omitted and the pressure measuring unit 30 may be provided at the plane portion 26a of the jig 26.

Although according to the embodiment, the nozzle holder 22 and the nozzle 23 which are exclusively for measurement are mounted to the front end portion of the main spindle 21 of the main spindle device 20, instead, only the tool holder and the tool may be mounted to the main spindle 21 and the air injecting nozzle 23 may be mounted to an outer peripheral face of the main spindle device 20.

A nozzle for injecting a liquid of coolant, oil or the like may be used in place of the air injecting nozzle 23.

The orifices 28 may be provided at two portions and an intermediate pressure between the two orifices 28 may be measured by the pressure measuring unit 30.

The jig 26 may be formed with a circular shape, a quadrangular shape or a groove or the like, and an edge portion thereof maybe used for setting the X, Y axes initial coordinates positions Px, Py and measuring the X, Y axes coordinates positions.

A surface roughness of the worked surface Wa of the work W may be calculated by the surface shape calculating unit 46 based on the pressure measured by the pressure measuring unit 30.

High frequency components of the pressure data may be removed by simple moving average or weighted moving average methods by subjecting the pressure measured by the pressure measuring unit 30 to smoothing processing (filtering processing).

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A surface shape determining device for a machining apparatus machining a work by using a tool mounted to a main spindle device which is numerically controlled to move in X, Y and Z axes, the surface shape determining device determining surface shape of a measured object and comprising:
a fluid injecting unit supplying fluid from a fluid supply source to a nozzle mounted to the main spindle device and injecting the fluid from a front end of the nozzle to the measured object;
a pressure measuring unit measuring pressure of the fluid of the fluid injecting unit;
a nozzle movement control unit moving the nozzle together with the main spindle device, wherein the fluid injecting unit supplies fluid to the nozzle while the movement control unit moves the nozzle along an outer periphery of the measured object;
a surface shape calculating unit calculating the surface shape of the measured object in accordance with change in pressure of the fluid measured by the pressure measuring unit; and
an informing unit informing data of the surface shape calculated by the surface shape calculating unit,
wherein the measured object is a jig arranged at a reference position which is another member of the work,
the surface shape determining device further comprising:
a Z axis initial coordinate value setting unit for setting a Z axis initial coordinate value at a Z axis initial coordinate position which is a position at which the main spindle device opposes a plane portion of the jig and is located a predetermined distance in a Z axis direction between the front end of the nozzle and the plane portion of the jig;
an X axis initial coordinate value setting unit setting an X axis initial coordinate value at an X axis initial coordinate position which is a position at which the main spindle device opposes a first stepped portion formed at the jig and is located a predetermined distance in a Z axis direction between the front end of the nozzle and the first stepped portion;
a Y axis initial coordinate value setting unit setting a Y axis initial coordinate value at a Y axis initial coordinate position which is a position at which the main spindle device opposes a second stepped portion formed at the jig and is located a predetermined distance in a Z axis direction between the front end of the nozzle and the second stepped portion;
a pre-working initial data storing unit storing pre-working initial data including respective relationships between coordinates of three axes and the pressure, which are measured by the pressure measuring unit such that the nozzle is moved so as to pass through the respective initial coordinate positions of the three axes and the fluid is injected to the jig before working the work;
an after-working data storing unit storing after-working data including respective relationships between the coordinates of three axes and the pressure, which are measured by the pressure measuring unit such that the nozzle is moved to the respective initial coordinate positions of the three axes in series and the fluid is injected to the jig after working the work;
a measured coordinate value generating unit generating respective measured coordinate values of three axes in accordance with the pre-working initial data and the after-working data; and
a moving amount correcting unit correcting a moving amount of the main spindle device in the three axes of work data in accordance with the respective initial coordinate values and the respective measured coordinate values.

2. The surface shape determining device according to claim 1, wherein the surface shape calculating unit calculates a position of a stepped portion or a hole formed at the measured object.

3. The surface shape determining device according to claim 1, wherein the surface shape calculating unit calculates a flatness of the measured object.

4. The surface shape determining device according to claim 1, further comprising:

a center coordinates calculating unit calculating center coordinates of a hole formed on the measured object;

a hole diameter calculating unit calculating a hole diameter; and a distance calculating unit calculating a distance between centers of two holes formed on the measured object.

5. The surface shape determining device according to claim 1, wherein the nozzle movement control unit moves the nozzle at constant speed together with the main spindle device in a state of maintaining a distance between the front end of the nozzle of the fluid injecting unit and an inspection surface of the measured object.

6. The surface shape determining device according to claim 1, wherein inclined surfaces are provided between the plane portion of the jig and a first stepped portion and a second stepped portion, and the inclined surface slopes away from the front end of the nozzle as the inclined surface approaches the first or second stepped portion.

7. A surface shape determining method for a machining apparatus machining a work by using a tool mounted to a main spindle device which is numerically controlled to move in X, Y and Z axes and includes a nozzle for injecting fluid and a pressure measuring unit for measuring pressure of the fluid, the surface shape determining method determining a surface shape of a measured object and comprising the steps of:

injecting the fluid from the nozzle to the measured object and the pressure measuring unit measuring the pressure of the fluid while moving the nozzle in the X and Y axes directions at constant speed with maintaining distance between the nozzle and a working surface of the work at a predetermined value, while maintaining the nozzle out-side an outer periphery of the measured object;

calculating the surface shape of the measured object in accordance with the measured pressure of the fluid, setting initial coordinate values of the three axes of the nozzle before working the work;

moving the nozzle in the three axes so as to pass through respective initial coordinate positions of the three axes and injecting the fluid from the front end of the nozzle in order to measure the respective coordinates of the three axes and pressure before working the work;

storing pre-working initial data of the nozzle including respective coordinates of the three axes and pressure before working the work;

removing the nozzle from the main spindle device and mounting a working tool to the main spindle device;

moving the main spindle device in the three axes directions to thereby work the work by the working tool;

removing the working tool after finishing working and mounting the nozzle to the main spindle device;

injecting the fluid from the front end of the nozzle to the measured object so as to measure the respective coordinates of the three axes and pressure by moving the nozzle to respective initial coordinate positions in series so as to measure pressure at respective initial coordinate position of the three axes of the nozzle after working the work;

storing after-working data including respective relationships between the coordinates of three axes and the pressure after working the work;

generating measured coordinate values of the three axes in accordance with the pre-working initial data and the after-working data; and correcting moving amount in accordance with the measured coordinate values and the initial coordinate values of the three axes.

8. The surface shape determining method according to claim 7, wherein the calculated surface shape of the measured object includes center coordinates of a hole formed on the measured object, hole diameter of the hole, center interval distance of the holes or flatness of the measured object.

* * * * *